United States Patent [19]

Ishikawa et al.

[11] Patent Number: 5,379,397
[45] Date of Patent: Jan. 3, 1995

[54] DISK STORAGE CONTROL DEVICE INCLUDING A SECTOR NUMBER REGISTER AND RANGE DETECTION CIRCUITRY FOR READING AND WRITING TO A RANGE OF DETECTORS

[75] Inventors: Yutaka Ishikawa; Noboru Sato, both of Tokyo, Japan

[73] Assignee: NEC Corporation, Tokyo, Japan

[21] Appl. No.: 790,388

[22] Filed: Nov. 12, 1991

[30] Foreign Application Priority Data

Nov. 13, 1990 [JP] Japan ................................. 2-306570
Nov. 20, 1990 [JP] Japan ................................. 2-315341

[51] Int. Cl.6 .................... G06F 12/06; G06F 13/00
[52] U.S. Cl. .................................. 395/425; 395/275; 364/DIG. 1; 360/48
[58] Field of Search ............. 395/425, 275; 360/39, 360/40, 48, 49, 72.2; 369/54

[56] References Cited

U.S. PATENT DOCUMENTS

| | | | |
|---|---|---|---|
| 4,068,301 | 1/1978 | Ishino et al. | 395/425 |
| 4,456,933 | 6/1984 | Schneider et al. | 360/49 |
| 4,494,157 | 1/1985 | Ina et al. | 360/48 |
| 4,554,598 | 11/1985 | Tarbox et al. | 360/48 |
| 4,839,878 | 6/1989 | Inoue | 369/54 |
| 4,918,651 | 4/1990 | Bonke et al. | 395/800 |
| 5,068,755 | 11/1991 | Hamilton et al. | 360/72.2 |

*Primary Examiner*—Glenn Gossage
*Attorney, Agent, or Firm*—Whitham, Curtis, Whitham & McGinn

[57] ABSTRACT

An external memory control device which is capable of reducing the time required for processings such as write and read of data for the storage areas of an external memory device, such as a disk, is disclosed. The external memory control device includes a smallest sector number register and a largest sector number register which store the smallest and the largest sector numbers, respectively, within a processing range on a track that is designated by a processing request signal frokm a central processing unit, and a processing range detecting part which detects whether a sector number read from the designated track is within the processing range. In this external memory control device, if the sector number read from the designated track is within the processing range, the processings start from the next sector, so that waiting until the arrival of the smallest sector number is no longer needed, and the time required for processing per track can be reduced.

8 Claims, 6 Drawing Sheets

DISK STORAGE CONTROL DEVICE INCLUDING A SECTOR NUMBER REGISTER AND RANGE DETECTION CIRCUITRY FOR READING AND WRITING TO A RANGE OF DETECTORS

BACKGROUND OF THE INVENTION

1. Field of the Invention

The present invention relates to a control device which controls an external memory device of a computer system, and more particularly, to a control device of this kind which stores a minimum unit of write or read data in a unit storage area together with identification information.

2. Description of the Prior Art

A control device which controls an external memory device is provided between a host system, namely, a central processing unit (CPU) and the external memory device, and performs the control for writing of data to the external memory device, and reading of data from the external memory device, under the control of the host system.

In a magnetic disk device which is a representative external memory device, a unit storage area on a magnetic disk for storing a smallest unit of write or read data is called a sector. Identification information, which is stored in the sectors, comprises a head number which specifies a magnetic head that accesses the storage surface to which the sectors belong, a track number which specifies each track on the storage surface, and a sector number which identifies one of a large number of sectors contained in each of the tracks.

In writing or reading data of the smallest unit (referred to as a unit data hereinafter), a magnetic disk control device first selects the magnetic head and the track corresponding to a sector designated by the host system, and instructs the magnetic disk device so as to read the sector identification information from the designated sector by driving the magnetic head to the selected track. The magnetic disk control device discriminates whether or not the sector number among the sector identification information that was read out coincides with the sector number designated by the host system, and carries out a processing such as write or read of a unit data to the sector if they coincide with each other, and controls the magnetic disk device so as to read the identification information of the adjacent sector if they do not coincide.

In the magnetic disk device, write or read of a unit data is ordinarily carried out for a plurality of sectors of at least one track by one request for processing. In the prior art magnetic disk control device, first, the sector number of the starting point of a processing such as writing or reading (referred to as a processing hereinafter) for the track is stored in a first register and the number of sectors to be processed or the sector number of the completion point of the processing is stored in a second register. If the sector number that is read out and the stored contents of the first register, that is, the sector number of the starting point of the processing, are found to be coincident with each other upon comparison, the magnetic disk device is controlled so as to read the sector number of the next sector after performing the processing for that sector, and the stored contents of the first register is updated with the sector number of the next sector. Further, if the stored contents of the second register is the number of sectors including objects (data) to be processed, the number is decremented by one.

If the sector number that is read out does not coincide with the stored contents of the first register, the magnetic disk device is controlled so as to read the sector number of the next sector without performing the processing for that sector.

When, after repetition of a series of the above-mentioned steps, the number of sectors including objects (data) to be processed, which is the stored contents of the second register, becomes zero (or if the stored contents of the second register is the sector number of the sector at which the processing is completed, when this sector number coincides with the sector number that is read out), the sector number that is read out signifies the sector number of the sector at which the processing is completed, so that the processing for this sector is performed, completing the processings for the track to which these sectors belong.

Since processing in the prior art magnetic disk device as described above will not be carried out until the stored contents of the first register, namely, the sector number of the processing starting point, agrees with the sector number that is read out, the state in which there occurs no processing will persist until the sector number of the starting point of the processing, which is the stored contents of the first register, is read out, even if the sector number read out first is the sector number of the sector of the object to be processed. For example, suppose that each track consists of 16 sectors which run from sector number (0) to sector number (15), the sector numbers of the objects to be processed are from (2) to (9), and the magnetic head is situated immediately in front of the sector number (6). Further, suppose that sector number (2) is stored in the first register. As the reading of the sector numbers starts, the first sector number that will be read is (6) so that the coincidence with the sector number (2) stored in the first register will not be obtained. Accordingly, the processing for sector (6) will not take place, and the sector number (7) of the next sector will be read out. However, this sector number (7) also does not coincide with the sector number (2) so that no processing will take place, and it will proceed to read the sector number of the following sector. In this manner, the state with no processing will persist for the sectors with sector numbers (8), (9), . . . , (15), (0), and (1), and the processing will take place for the first time when the sector number (2) is finally read.

As in the above, in the prior art external memory control device, there will persist the state in which no processing for the sector of the current position of the head will take place even if the head is situated at a sector which is one of the objects to be processed, so that it will take longer time for completion of the processing of one track.

The external memory devices for which control similar to the aforementioned magnetic disk control device applies include the flexible disk memory device and the optical disk memory device besides the magnetic disk device.

BRIEF SUMMARY OF THE INVENTION

Object of the Invention

It is an object of the present invention to provide an external memory control device which can reduce the time required for "processing" (reading and writing, for example) one track of an external memory device.

Summary of the Invention

The external memory control device according to the present invention includes a smallest sector number register and a largest sector number register which store the smallest and the largest sector numbers, respectively, among the sector numbers belonging to one track designated by a processing request signal from the host system. Also included is a processing range detection part which detects whether the sector number read from the track belongs to the sector numbers within the processing range designated by the processing request signal based on the stored contents of these two registers. A sector processing discrimination part generates a discrimination signal that is turned off when the sector number from the track is determined, based on the output of the processing range detection part and the contents of the two registers, to belong to the processing range and is the first sector number read from the track, is turned on when it is the second or a subsequent sector number to be read out, and is turned off when it is outside the processing range. Further, a processing completion control part generates a processing completion signal when the sector signal read out is the sector number of the sector which is the last sector to be processed for the track. The external memory control device controls the external memory device so as to read the sector number of the next sector without carrying out the processing for the sector corresponding to the discrimination signal when the discrimination signal is turned off. When the discrimination signal is turned on, the external memory control device controls the external memory device to carry out processing for the corresponding sector, then proceeds to read the next sector number, to carry out the processing for the sector corresponding to a processing completion signal in response to the generation of the processing completion signal, and to stop the reading of the sector numbers that follow.

The sector processing discrimination part includes the sector number registers and a comparator. When the sector number, which is read from the track designated by the processing request signal R/W, is a sector number within the processing range and further is the number of the sector read first from the track, the sector discrimination part stores the number of sector to be read next in the sector number register. When the read sector number is the sector number read at a second or later time, the sector discrimination part updates the stored contents of the register to the sector number to be read next. Moreover, when the sector number reaches the largest sector number, the sector discrimination part stores the smallest sector number in the register. Finally, when the sector number read from the track and the stored contents of the register are found to be coincident upon comparison in the comparator, the sector discrimination part generates a discrimination signal which is turned on.

Moreover, the processing completion control part includes a processing residual register and a zero detection circuit. The control part stores the total number of the sectors within the processing range before reading the sector number from the track designated by the processing request signal R/W, and decrements the stored contents of the register by one whenever the discrimination signal is turned on. The zero detection circuit generates the processing completion signal when the stored contents of the register becomes zero.

Furthermore, the processing completion control part includes a processing completion sector number register. When the sector number read out first from the track designated by the processing request signal R/W is the sector number within the processing range, the control part stores the sector number as it is in the register, and when it is a sector number outside the processing range, stores the largest sector number in the register, and when the sector number read out coincides with the stored contents of the register, the control part generates a processing completion signal.

As described in the above, in the external memory control device according to the present invention, when the sector number read out from the track designated by the processing request signal R/W is within the processing range designated by the signal, the processing will be started from the sector having the next sector number. Therefore, there is no need to hold the processing until the sector with the smallest sector number of the processing range, as was the case in the prior art control device, so that the time required for processing one track can be reduced.

BRIEF DESCRIPTION OF THE DRAWINGS

The above-mentioned and other objects, features, and advantages of this invention will become more apparent by reference to the following detailed description of the invention taken in conjunction with the accompanying drawings, wherein.

DETAILED DESCRIPTION OF THE INVENTION

Figure 1:
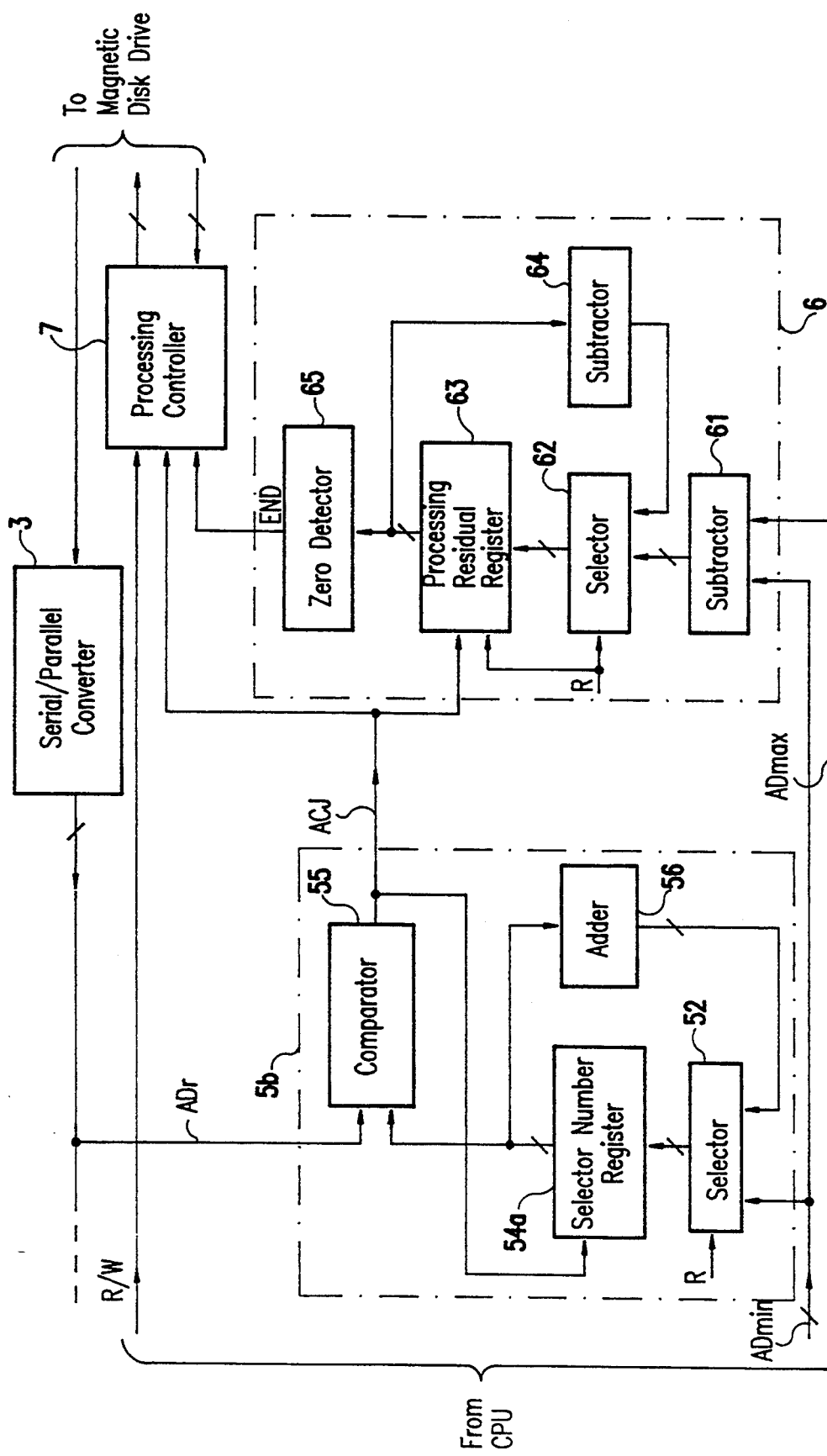
FIG. 1 is a block diagram of a part of the magnetic disk control drive according to the prior art.

FIG. 1 shows a prior art magnetic disk control device which has a serial/parallel converter 3, a sector processing discrimination part 5b, a processing completion control part 6, and a processing control part 7.

The serial/parallel converter 3 is inserted between the magnetic disk control device shown in the figure and a magnetic disk device (not shown), and converts the sector numbers of the unit data that are transferred between them so as to be bit serial on the side of the magnetic disk device and to be bit parallel on the side of the magnetic disk control device.

The sector processing discrimination part 5b includes a selector 52 which selects the smallest sector number ADmin among a series of sectors contained in a track designated by a processing request signal R/W from a host system during the period prior to the reading (in a reset state when a signal R is enabled) from the track and, after the elapse of the period for the reset state, selects and outputs the incremented sector numbers. In other words, when the control line R becomes active, the selector 52 outputs the ADmin data, otherwise, the data from the adder 56 is output. The sector processing discrimination part also includes a sector number register 54a which receives the sector number from the selector 52 in response to a discrimination signal ACJ and outputs the sector number to a comparator 55 which compares a sector number ADr, which is an output read from the track supplied through the serial/parallel converter 3, and the sector number from the sector number register 54a and generates a discrimination signal ACJ which is turned on when both numbers coincide. The sector processing discrimination part further includes an adder 56 which outputs a sector number obtained by incrementing the sector number output by the sector number register 54a by one unit of the reading interval (for example, it is "1" if the adjacent sectors are sequentially read in continuous fashion, and it is "2" if every other sector is read). As described above, in this sector processing discrimination part 5b, the smallest sector number among a large number of sector numbers that belong to a track is stored in the sector number register 54 prior to the reading of the first sector number of the track, and the discrimination signal ACJ is turned on when the smallest sector number coincides with the sector number ADr, by which the contents of the sector number register 54a is updated. In other words, the sector processing discrimination part 5b outputs a discrimination signal ACJ by turning it on when the sector number read becomes equal to the smallest sector number ADmin and updates the stored contents of the sector number register 54a to the next sector number, and thereafter, the turning on of the discrimination signal ACJ and the updating of the stored contents of the register 54a are repeated whenever the sector number read out coincides with the sector number from the register 54a, and the discrimination signal ACJ is kept in the off-state and the stored contents of the register 54a are also unchanged.

The processing completion control part 6 has a subtractor 61 which computes and outputs the sector number within the processing range of a track from the smallest sector number ADmin and the largest sector number ADmax designated by the processing request signal R/W from the host system, a selector 62 which selects the sector number from the subtractor 61 in the reset state and selects the decremented sector number otherwise, a processing residual register 63 which stores and outputs the sector number from the selector 62 whenever the reset state and the discrimination signal ACJ are in the on-state, a subtractor 64 which outputs the sector number from the register 63 decremented by "1", and a zero detection circuit 65 which generates a processing completion signal END by detecting that the sector number from the register 63 is zero. As in the above, the processing completion control part 6 stores the sector number within the processing range of the processing request signal R/W in the processing residual register 63, decrements the sector number every time when the discrimination signal ACJ is in the on-state, generates a processing completion signal END when the sector number goes to zero, and detects by this that the processing for one track is completed.

The processing control part 7 receives the processing request signal R/W, the discrimination signal ACJ and the processing completion signal END, and when the discrimination signal ACJ corresponding to the sector number read from the track is in the off-state, the processing control part 7 proceeds to read the sector number of the next sector without performing the processing for the sector with that sector number, and performs the processing for the sector with that sector number and reads the sector number of the next sector when the discrimination signal ACJ is in the on-state. This operation is repeated thereafter, and subsequent to the execution of the processing for the sector with the sector number corresponding to a processing completion signal END in response to the generation of a processing completion signal END, the reading of sector numbers for the ensuing sectors is stopped. This completes the processing for one track.

As in the above, the magnetic disk device controlled by this magnetic disk control device starts to carry out the processing for the sector with a sector number read from the track designated by the processing request signal R/W when the sector number read coincides with the smallest sector number within the processing range designated by the processing request signal R/W, and thereafter carries out sequentially the processing for each sector, and when the sector number reaches the largest value within the processing range, the processing for that sector is completed. This completion indicates the completion of the processing for one track.

Figure 2:
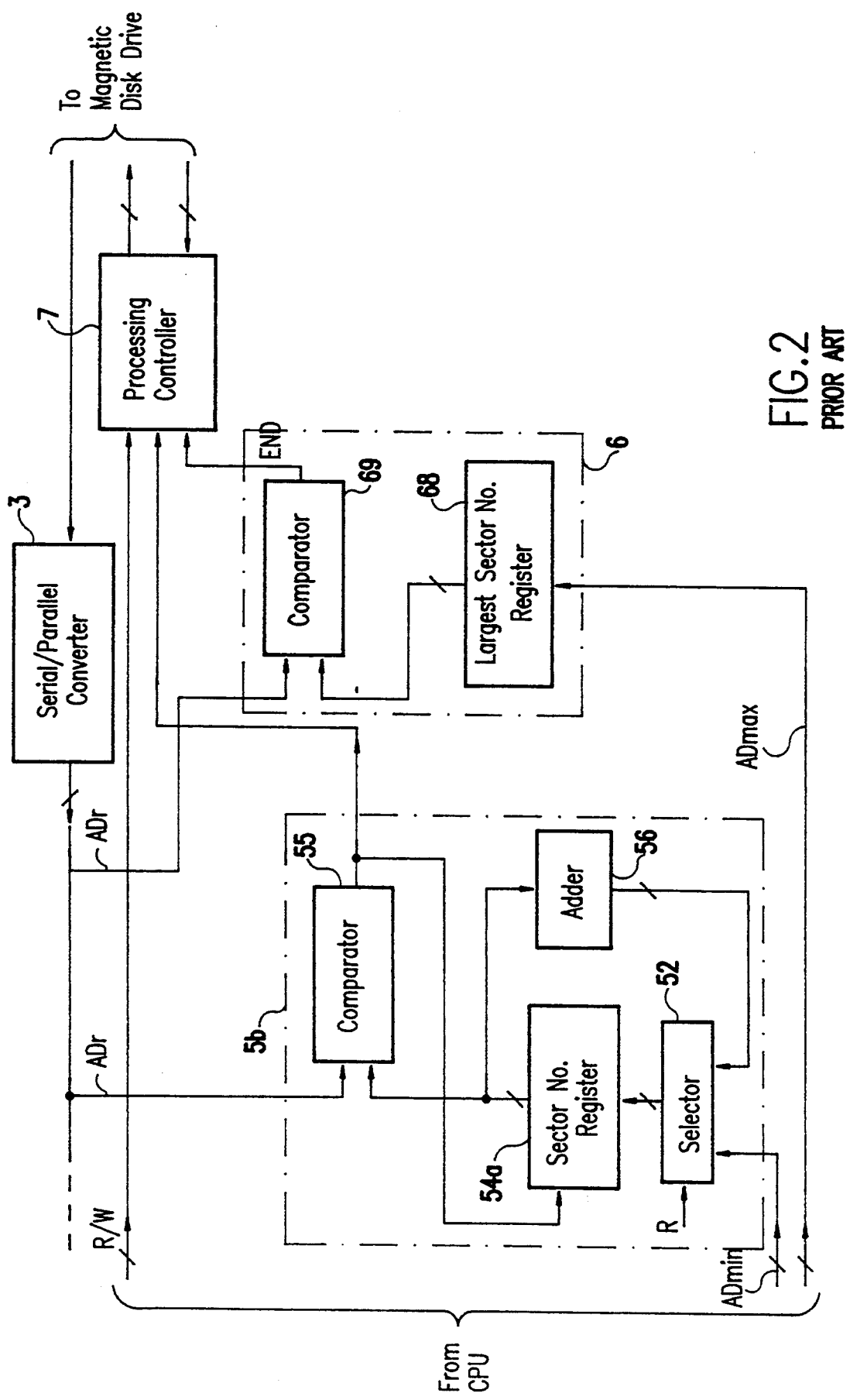
FIG. 2 is a block diagram of the same part as that shown in FIG. 1 of the magnetic disk control device according to the prior art.

Next, referring to FIG. 2 which shows another example of a magnetic disk control device of the prior art, this example is identical to the example shown in FIG. 1 except for a part of a processing completion control part 6b, so that the components common to FIG. 1 are assigned common reference numerals to omit further detailed explanation.

The processing completion control part 6b has a processing completion sector address register 68 which stores the largest sector number ADmax within the processing range of the track designated by the processing request signal R/W during the reset state (R) period and outputs it later, and a comparator 69 which generates a processing completion signal END in response to the coincidence of the largest sector number from the register 68 and the sector number of the read output supplied by the serial/parallel converter 3. Except for the above-mentioned point the structure of the present example is the same as that of the sample shown in FIG. 1.

Figure 3:
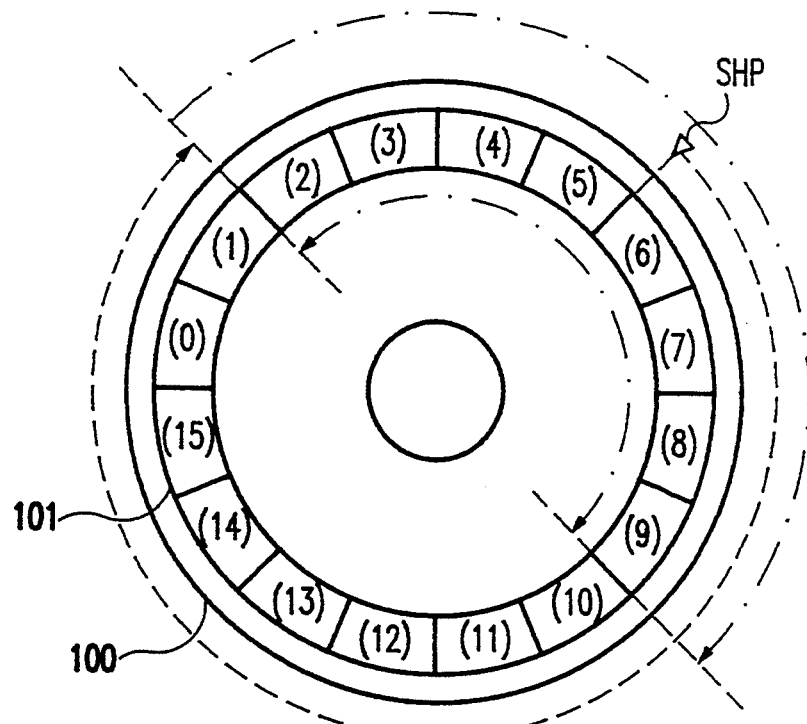
FIG. 3 is a plan view of the magnetic disk for describing the operation of the magnetic disk control device shown in FIGS. 1 and 2.

Referring to FIG. 3 which shows a plan view of a magnetic disk for describing the operation of the prior art magnetic disk control devices shown in FIGS. 1 and 2, magnetic disk 100 contains a plurality of tracks 101 where these tracks are each subdivided into 16 sectors having sector numbers from (0) to (15).

Assume that a magnetic head selected according to the R/W designation of a processing request signal from the host system is moved to a predetermined track 101, and is located in the initial state before the read of the sector number at a (start head) position immediately in front of the sector number 6 (position SHP in FIG. 3). Further, assume that the sectors of the object for processing are from sector number (2) to sector number (9) (namely, the "processing range" is from sector (2) sector (9)), and that the processing for these sectors is carried out sequentially. As may be clear from the above description, the sector number (2) is stored under these conditions in the sector number register 54a.

With the start of read of the sector numbers of the track 101, the sector number to be read first is (6) so that the result of comparison by the comparator 55 is noncoincidence, and the discrimination signal ACJ remains in the off-state. As a result, the processing for the sector with sector number (6) is not carried out, and the sector number (7) is read out. Since the sector number (7) does not coincide with the stored contents of the sector number register 54a, that is, the sector number (2), so that the discrimination signal ACJ remains in the off-state, and the processing for the number (7) is not carried out and the sector number (8) of the next sector is read out.

As in the above, the state with no processing persists up to the sectors with sector number (1), namely, for the sectors from sector number (6) to sector number (1). When sector number (2) is read, it coincides with the sector number (2) that is stored in the selector number register 54a so that the processing for the sector with number (2) is carried out. At the same time, the stored contents of the register 54a, namely, the sector number (2) is updated to (3). The sector number (3) of the next sector is read and these sector numbers are compared in the comparator 55.

In this way, the processing for sectors up to the sector number (8) is completed and the sector number (9) is stored in the register 54a. When the sector number (9) is read, the processing completion control part 6 or 6b generates a processing completion signal END, the processing for the track 101 is completed with the completion of the processing for the sector with the section number (9).

As in the above, in the magnetic disk control device according to the prior art, despite the fact that the magnetic head is situated at a sector position within the processing range of the processing request signal R/W designation, the state with no processing for these sectors persists, and as a result, the time required for processing one track is increased.

Figure 4:
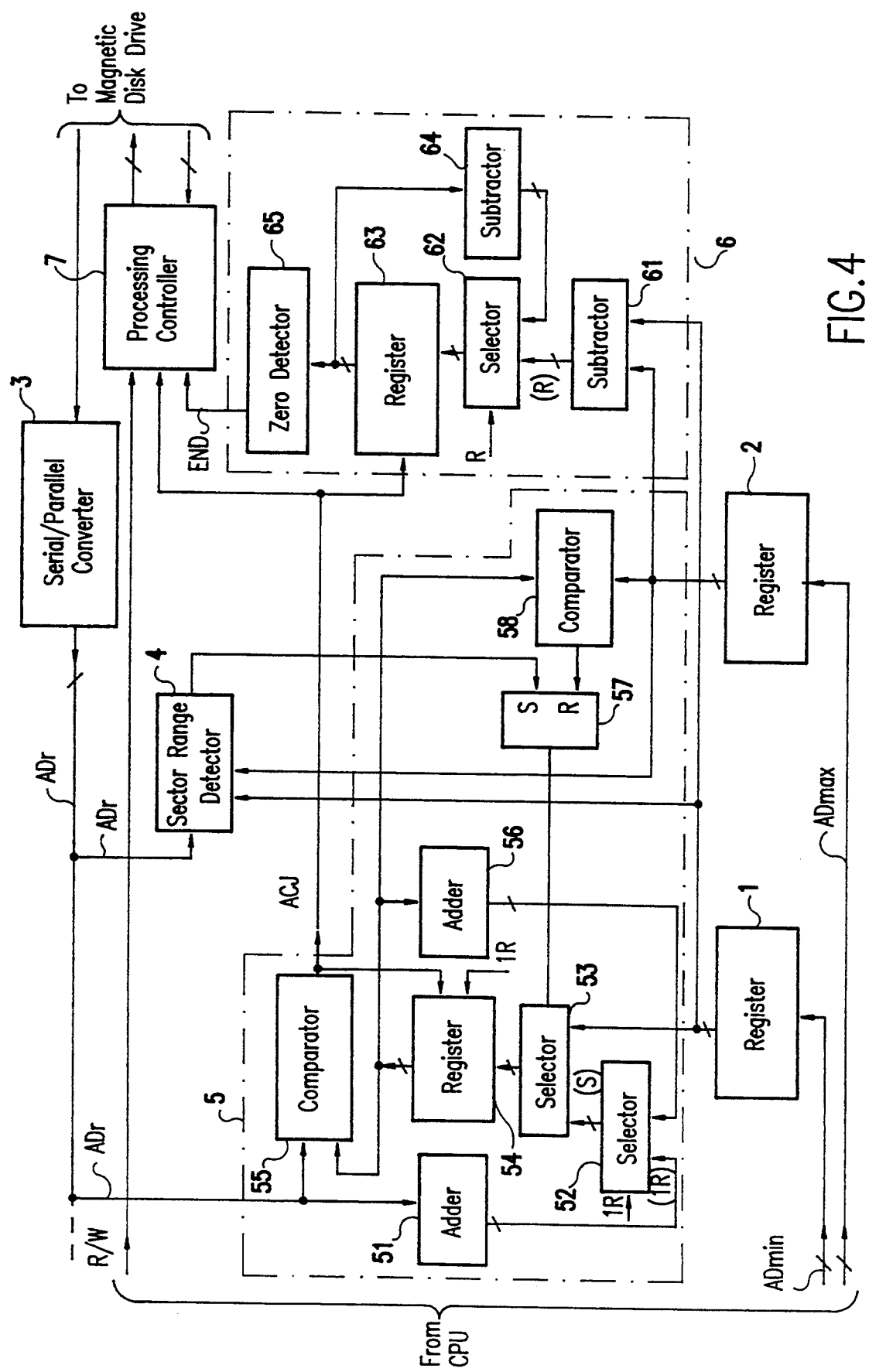
FIG. 4 is a block diagram for a first embodiment of an external memory control device according to the present invention.

Next, referring to FIG. 4 which shows the principal part of the first embodiment of the present invention, the magnetic disk control device according to the present embodiment is constituted of a smallest sector number register 1 which stores the smallest sector number corresponding to the sector of the starting point of processing for one track designated by the processing request signal R/W from the CPU, a largest sector number register 2 which stores the largest sector number corresponding to the sector of the completion point of the same processing as in the above, a serial/parallel converter 3, a processing range detection part 4, a sector processing discrimination part 5, a processing completion control part 6 and a processing control part 7. As is clear from the constitution shown in the figure, the present embodiment differs from the prior art magnetic disk control device shown in FIG. 1 in that there are added the smallest sector number register 1, the largest sector number register 2 and the processing range detection part 4, and in the internal constitution of the sector processing discrimination part 5.

The smallest sector number register 1 and the largest sector number register 2 store the smallest sector number and the largest sector number, respectively, among a large number of sectors within the processing range of one track.

The processing range detection part 4 compares the sector number ADr supplied by the serial/parallel converter 3 with the smallest and the largest sector numbers from the smallest sector number register 1 and the largest sector number register 2, respectively, and identify whether the sector number ADr is a sector number within the processing range. Such a processing range detection part 4 can easily be realized by the combination of a comparator which compares the magnitude of the sector numbers and a logic gate.

The sector processing discrimination part 5 includes an adder 51 which adds one unit (ordinarily one) of the sector reading interval to the sector number ADr that is read out, a sector number register 5.4 which stores the supplied sector number at the time of reading the first sector number of a track control signal 1R is enabled and at other times stores and outputs the sector number in response to the on-state of the discrimination signal ACJ, and a second adder 56 which outputs a sector number obtained by incrementing the sector number from the sector number register 54 by one unit of the sector read interval. The sector processing discrimination part further includes a first selector 52 which selects the sector number from the first adder 51 at the time of reading of the first sector number of the track and at other times selects and outputs the incremented sector number from the second adder 56, a comparator 58 which compares the largest sector number from the largest sector number register 2 and the sector number from the sector number register 54 and detects whether these sector numbers coincide with each other, and a flip-flop 57 which goes to the reset state when the sector numbers coincide and goes to the set state when it is determined by the processing range detection part 4 that the sector number ADr that is read is within the processing range. The sector processing discrimination part 5 further includes a second selector 53 which selects the sector number from the selector 52 when the flip-flop 57 is in the set state and selects the sector number from the smallest sector number register 1 when the flip-flop is in the reset state, and supplies the smallest sector number to the sector number register 54, and a comparator 55 which compares the sector number ADr that is read and the sector number from the sector number register 54 and generates a discrimination signal ACJ which goes to the on-state when they coincide and goes to the off-state when they do not coincide.

Figure 5:
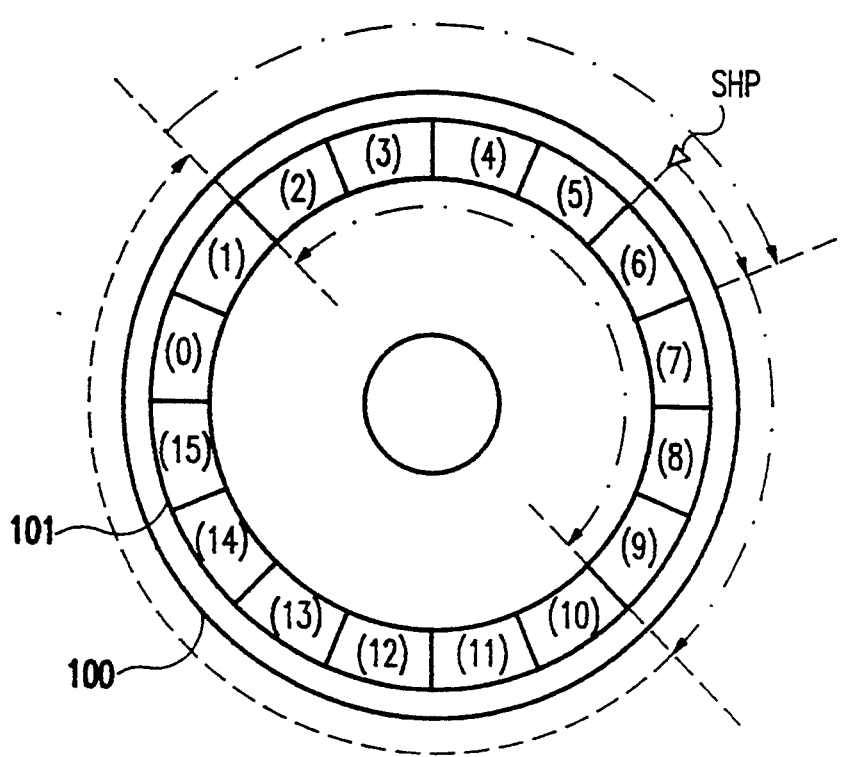
FIG. 5 is a plan view for the magnetic disk for describing the operation of the first embodiment.

The serial/parallel converter 3, the processing completion control part 6, and the process control part 7 are identical to those of the prior art shown in FIG. 1 so the description is omitted here Next, referring to FIG. 5 showing a plan view analogous to FIG. 3, a track 101 of a magnetic disk 100 is segmented into 16 sectors with sector numbers from (0) to (15), and it will be assumed that the sectors (2) through (9) are designated as a processing range or object.

In order to describe first the case where the sector number ADr read out first from the track 101 is within the processing range designated by the processing request signal R/W it will be assumed that a start head position (SHP) of a magnetic head in an initial state is located at a position immediately in front of the sector with sector number (6).

When it is detected that the sector number ADr read out first from the track designated by the processing request signal R/W is located within the processing range, the flip-flop 57 goes to the set state and the selector 53 selects the output of the selector 52, the selector 52 selects the output of the adder 51, and the sector number register 54 updates its storage contents. Accordingly, the sector number (7) following the sector number read first ((6) in FIG. 5, for example) is stored in the sector number register 54. For the sector number (6) which was read first, the sector number register 54 changes from the state where nothing is stored to the state where the sector number (7) is stored, the result of comparison in the comparator 55 is "noncoincidence" so that the discrimination signal ACJ remains in the off-state. Since no processing is given for the sector with the sector number (6), the next sector number (7) will be read out. Since the sector number (7) that is read out next coincides with the stored contents of the sector number register 54, the discrimination signal ACJ is turned on, the processing for the sector with the sector number (7) is carried out by the processing control part 7, and the next sector number (8) is read out. At the same time, the stored contents of the sector number register 54 is updated by the discrimination signal ACJ to the sector number (8).

When the stored contents of the sector number register 54 is updated to sector number (9) which is the largest sector number within the processing range after repetition of the operation analogous to that described above, the flip-flop 57 is brought to the reset state by the comparator 58, and the selector 53 selects the output of the smallest sector number register 1, that is, the smallest sector number within the processing range. As the sector number (9) is read out and the discrimination signal ACJ is turned on, the storage contents of the sector number register 54 is updated to the smallest sector number (2). After the processing for the sector with the sector number (9), the sector number that is read out is (10) so that the discrimination signal ACJ is turned off, and the reading for the next sector number is carried out without processing for the sector with the sector number (10). At this time, the stored contents of the sector number register 54 is not updated. Thereafter, similar operation is repeated, and reading of the sector number alone is carried out until the sector number (2) is arrived at.

When the sector number (2) is read, the discrimination signal is turned on, and the sector number (3) is read out after performing the processing for the sector with the sector number (2). At the same time, the flip-flop 57 is brought to the set state by the processing range detection part 4, and the stored contents of the sector number register 54 is updated to (3) via the adder 56, the selectors 52 and 53. Thereafter, similar operation will be repeated.

The sector number which is the storage contents of the processing residual register 63 is reduced every time when the discrimination signal ACJ is turned on, and when the discrimination signal ACJ is turned on upon reading of the sector number (6), the sector number which is the storage contents of the processing residual register 63 becomes zero. The zero detection circuit 65 which responds to this situation outputs a processing completion signal END, and after carrying out the processing for the sector with the sector number (6) the processing control part 7 ceases reading the sector numbers that follow.

With the above-mentioned operation all the processing for the sectors within the processing range of the track designated by R/W of the processing request signal is ended, completing the processing for the track.

If the first read sector number ADr is outside the range of processing ((14), for example), the flip-flop 57 is brought to the reset state by the processing range detection part 4, the output of the smallest sector number register, namely, the smallest sector number (2) is selected by the selector 53, and the result is stored in the sector number register 54.

Thereafter, reading of the sector number alone takes place until the sector number (2) is read out. The operation following the read of the sector number (2) is the same as the aforementioned operation for the sectors within the processing range. When the largest sector number (9) is reached, a processing completion signal END is issued, and the processing for one track is completed with the ending of the processing for the sector with the sector number (9).

As described above, in the present embodiment, if the sector number read first from a track designated by the processing request signal R/W falls within the processing range of the request signal, the processing is started from the sector following the read sector, so that it is possible to shorten the time required for processing the sectors in the track. It should be mentioned that the reason for starting the processing from the sector following the sector read out first is that, at the time of transmission of the sector number read out to the comparator 55, there is not yet stored the desired sector number in the sector number register 54.

Figure 6:
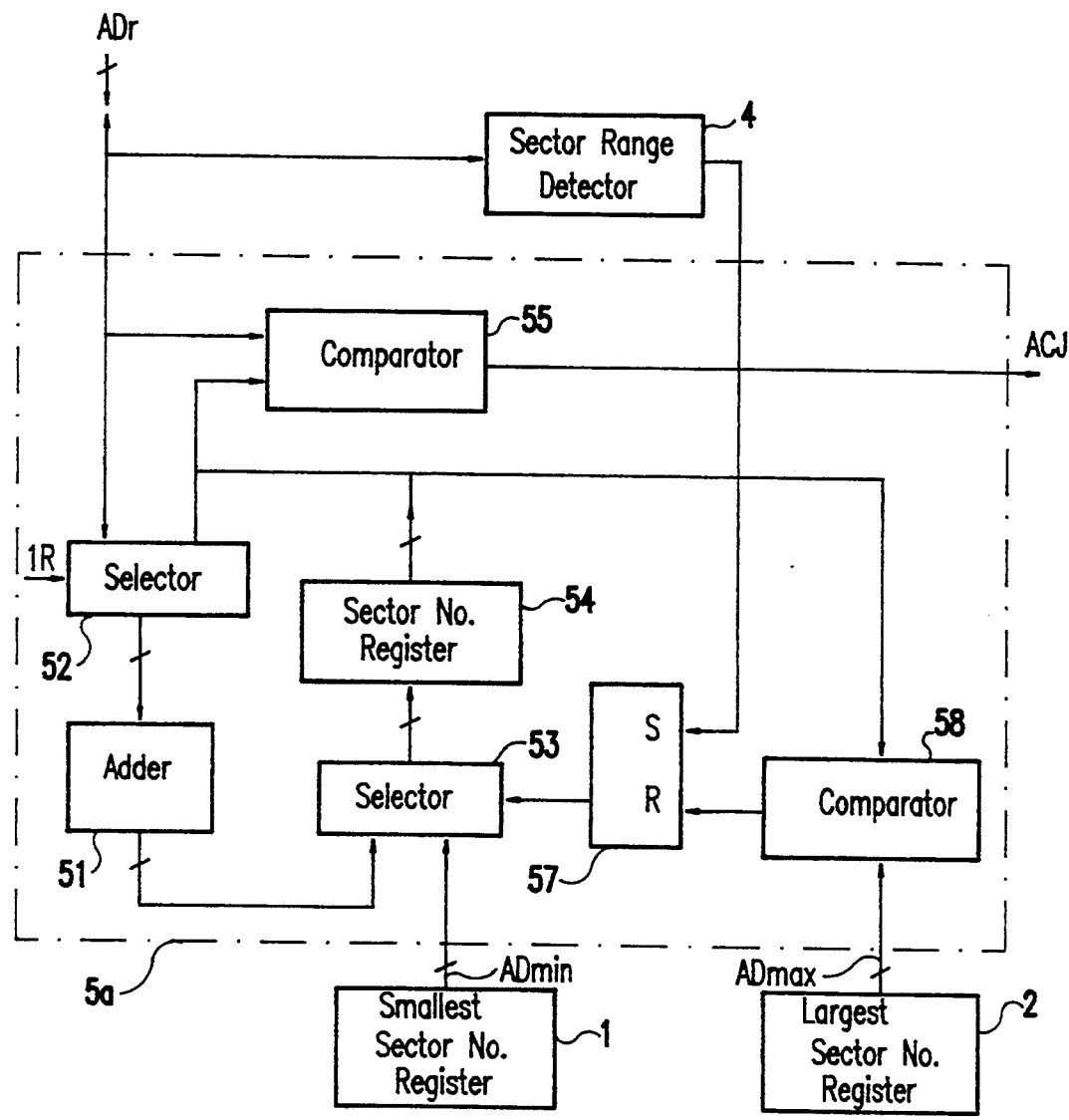
FIG. 6 is a block diagram for a second embodiment of an external memory control device according to the present invention.

Next, referring to FIG. 6 showing the second embodiment of the present invention, the sector processing discrimination part 5a combines the two adders 51 and 56 in the first embodiment into a single adder 51, the sector number first read from the track designated by the processing request signal R/W or the output of the sector number register 54 is supplied to the adder 51 according to the selection by the selector 52, and the output of the adder 51 is supplied to the selective input on the set (S) side of the selector 53. That is, the output of the adder 51 is selected by selector 53 when the flip-flop 57 is reset. Other parts of the operation are the same as in the first embodiment. Namely, the second embodiment is the same as the first embodiment except for the fact that the function of the adder 56 is served by the adder 51 so that further description will be omitted.

The second embodiment is more advantageous than the first embodiment in that its circuit constitution can be simplified.

Figure 7:
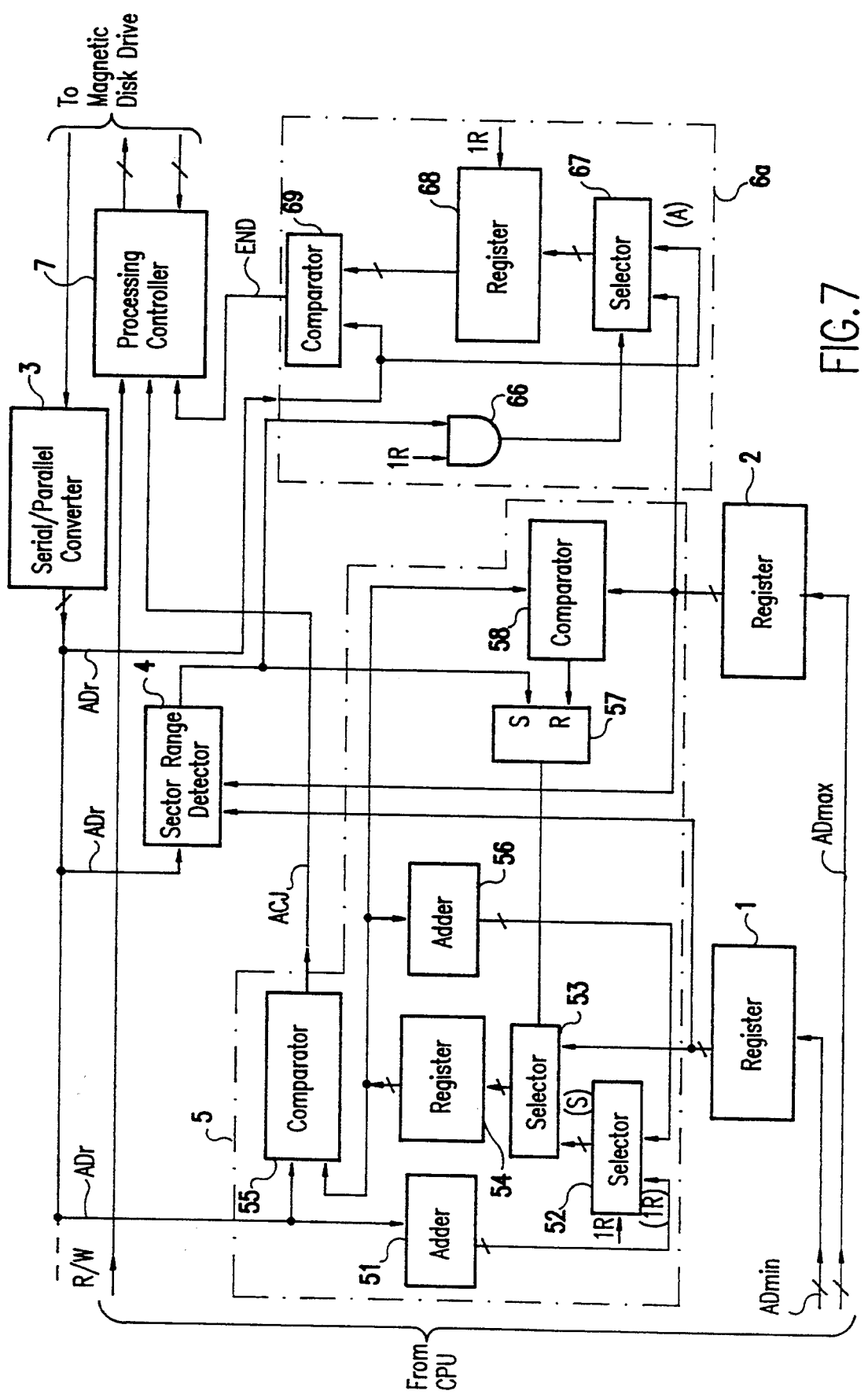
FIG. 7 is a block diagram for a third embodiment of an external memory control device according to the present invention.

Referring to FIG. 7 which shows the third embodiment of the present invention, this third embodiment is the same as the first embodiment except for the constitution of a processing completion control part 6a, so that the description that follows is limited to that of the control part 6a, omitting the description about the remaining parts.

The processing completion control part 6a includes a processing completion sector number register 68 which stores and outputs the sector number ADr read out first from the track designated by the processing request signal R/W, an AND type logic circuit 66 which outputs a signal which is turned on when the detection part 4 recognizes that the sector number read out first falls within the processing range designated by the processing request signal R/W. The processing completion control part 6a further includes, a selector 67 which selects the sector number read out first when the output signal of the logic circuit 66 is in the on-state and selects the largest sector number from the largest sector number register 2 when the output signal of the logic circuit 66 in the state and sends the selected selector number to the processing completion sector number register 68, and a comparator 69 which issues a processing completion signal END when the sector number ADr and the sector number from the processing completion sector number register 68 are coincident with each other.

In the third embodiment, if the sector number read out first from the track designated by the processing request signal R/W falls within the processing range designated by the processing request signal R/W, the sector number is stored at the timing of reading the first sector number in the processing completion sector number register 68. For the sector with the first read sector number, no processing is carried out (analogous to the first and the second embodiments).

Thereafter, the operation similar to that of the first embodiment is repeated, and when the sector number read out first is read again, a processing completion signal END is output from the comparator 69 to perform the processing for the sector with that sector number, by which the processing for one track is completed.

When the sector number that is read first falls outside of the processing range, the largest sector number within the processing range is stored in the processing completion sector number register 68. Since the operation thereafter is similar to the example of the prior art magnetic disk control device shown in FIG. 2, a further description will be omitted.

The third embodiment is more advantageous than the first embodiment in that it is possible to simplify the processing completion control part.

Further, in the third embodiment, it is possible to replace the sector processing discrimination part 5 with the sector processing discrimination part 5a (FIG. 6) of the second embodiment.

The aforementioned three embodiments are given in the form of a magnetic disk control device which controls the magnetic disk, but the external memory control device according to the present invention is also applicable to external memory devices using different storage medium so long as the data format is similar to a magnetic disk medium, such as a flexible disk device and an optical disk device.

Although the invention has been described with reference to specific embodiments this description is not meant to be construed in a limiting sense. Various modifications of the disclosed embodiments, as well as other embodiments of the invention will become apparent to persons skilled in the art upon reference to the description of the invention. It is therefore contemplated that the appended claims will cover any modifications or embodiments as fall within the true scope of the invention.

We claim:

1. An external memory control device which controls an external memory device so as to carry out a processing of data for a storage area in a processing range of said external memory device, said processing range being designated by a processing request signal from a central processing unit, whereby said external memory device is a memory device which has a large number of concentric storage tracks each being subdivided into a plurality of unit storage areas on a storage medium, and the designation of a storage area of said external memory device is carried out by designating one of said storage tracks, a starting unit storage area and a completion unit storage area, the external memory control device comprising:

first and second registers which respectively store the smallest identification number and the largest identification number among identification numbers of the unit storage areas belonging to the designated one of said storage tracks;

processing range discriminating means which discriminates whether an identification number read out from the designated one of said storage tracks corresponds to a unit storage area contained in the processing range designated by said processing request signal;

unit storage area processing discriminating means which generates, in response to a signal from the processing range discriminating means, a discrimination signal which is turned off when an identification number read from said designated one of said storage tracks is an identification number of a unit storage area contained in said processing range and is an identification number read first from the designated one of said storage tracks, and is turned on when said identification number read first from said designated one of said storage tracks is an identification number of a unit storage area contained in said processing range and is an identification number read out by a second or subsequent reading from the designated one of said storage tracks, and which is turned off when said identification number read from said designated one of said storage tracks is an identification number of a unit storage area which is not contained in said processing range;

processing completion control means which generates a processing completion signal when the identification number readout from said designated one of said storage tracks in response to the discrimination signal generated by the unit storage area processing discriminating means corresponds to the completion unit storage area of said processing range designated by said processing request signal; and processing control means which reads the identification number of a current unit storage area that belongs to said designated one of said storage tracks in response to said processing request signal, said processing control means reading the identification number of a next unit storage area within said processing range without carrying out the processing for the current unit storage area when said discrimination signal is in an off-state, and when said discrimination signal is in an on-state, said processing control means carries out the processing for the current unit storage area and then reads a next identification number for a next unit storage area, said processing control means terminating processing upon receiving said processing completion signal.

2. An external memory control device as claimed in claim 1, wherein said external memory device is a magnetic disk device.

3. An external memory control device as claimed in claim 1, wherein said processing completion means comprises:

a processing residual register which stores the total number of the unit storage areas contained in said processing range in the initial state prior to the reading of an identification number from said designated one of said storage tracks;

means for decrementing the number stored in said processing residual register every time said discrimination signal is turned on; and zero detection means which generates said processing completion signal when the number stored in said processing residual register becomes zero.

4. An external memory control device as claimed in claim 1, wherein said processing completion control means comprises:

a processing completion identification number register which stores the identification number read from said designated one of said storage tracks when the identification number read first from said designated one of said storage tracks is an identification number of a unit storage area that is contained within said processing range, and stores the largest identification number among the identification numbers of the unit storage areas contained within said processing range when the identification number read first from the designated one of said storage tracks is outside of the processing range; and comparison means for generating said processing completion signal when the identification number read from said designated track and the identification number stored in said processing completion identification number register are coincident with each other.

5. An external memory control device as claimed in claim 1, wherein said unit storage area processing discriminating means comprises:

a first adder which increments the identification number read from said designated one of said storage tracks;

an identification number register which stores and outputs said identification number read from said designated one of said storage tracks, a second adder which increments the identification number stored in the identification number register;

a first comparator which compares the identification number stored in said largest identification number register and the identification number stored in said identification number register;

a flip-flop which is reset in an initial state and when the output of said first comparator shows noncoincidence between the identification numbers stored in said largest identification number register and said identification number register, and is set when the output of said processing range discriminating means shows that the identification number read from said designated one of said storage tracks is an identification number within said processing range;

a first selector which selects the identification number from said first adder only when said identification number is the identification number read first from said designated one of said storage tracks and selects the identification number from said second adder at other times;

a second selector which selects the identification number stored in said smallest identification number register when said flip-flop is reset and selects the identification number from said first selector when said flip-flop is set, and supplies the selected result to said identification number register; and a second comparator which outputs said discrimination signal which is turned on when the identification number read from said designated one of said storage tracks and the identification number stored in said identification number register are coincident.

6. An external memory control device as claimed in claim 1, wherein said unit storage area processing discriminating means comprises:

an identification number register which, when said identification number read from said designated one of said storage tracks is an identification number of a unit storage area which is contained in said processing range and is the first identification number read from said designated one of said storage tracks, stores the identification number that is read next, said identification number register storing the identification number of the unit storage area read out in a second or subsequent reading from said designated one of said storage tracks; and a comparator which generates said discrimination signal which is turned on when said identification number read from said designated one of said storage tracks and the identification number which is stored in said identification number register are found to be coincident.

7. An external memory control-device as claimed in claim 6, wherein said smallest identification number is stored in said identification number register in an initial state prior to the reading of an identification number from said designated one of said storage tracks.

8. An external memory control device as claimed in claim 6, wherein said unit storage area processing discriminating means further comprises an adder and a first selector means for selecting said identification number read from the designated one of said storage tracks only when said identification number read from said designated one of said storage tracks is the identification number read first from said designated one of said storage tracks and for selecting the identification stored in said identification number register at other times, said unit storage area processing discriminating means further comprising a flip-flop and a second selector means for supplying an output of said adder to said identification number register when said flip-flop is set and for supplying the identification number stored in said smallest identification number register to said identification number register when said flip-flop is not set.

* * * * *